United States Patent
Hebert

(10) Patent No.: US 6,415,231 B1
(45) Date of Patent: Jul. 2, 2002

(54) METHOD AND APPARATUS FOR PLANNING AND PERFORMING A PRESSURE SURVEY

(76) Inventor: Joel J. Hebert, 919 Lakespur, Sugar Land, Fort Bend County, TX (US) 77479

(*) Notice: Subject to any disclaimer, the term of this patent is extended or adjusted under 35 U.S.C. 154(b) by 89 days.

(21) Appl. No.: 09/638,288

(22) Filed: Aug. 14, 2000

(51) Int. Cl.$^7$ ................................................. G01V 1/50
(52) U.S. Cl. ............................................................ 702/11
(58) Field of Search .............................. 702/9, 11, 12, 702/13, 14, 16

(56) References Cited

U.S. PATENT DOCUMENTS

| | | | |
|---|---|---|---|
| 4,607,524 A | 8/1986 | Gringarten | 73/152 |
| 4,703,277 A | 10/1987 | Kenyon et al. | 324/323 |
| 4,916,616 A | 4/1990 | Freedman et al. | 364/422 |
| 5,017,778 A | 5/1991 | Wraight | 250/254 |
| 5,299,128 A | 3/1994 | Antoine et al. | 364/422 |
| 5,388,044 A | 2/1995 | Hepp | 364/421 |
| 5,446,654 A | 8/1995 | Chemali et al. | 364/422 |
| 5,522,260 A | 6/1996 | Chappellat et al. | 73/151 |
| 5,615,115 A * | 3/1997 | Shilling | 702/12 |
| 5,699,246 A | 12/1997 | Plasek et al. | 364/422 |
| 5,937,362 A * | 8/1999 | Lindsay et al. | 702/9 |

* cited by examiner

*Primary Examiner*—Donald E. McElheny, Jr.
(74) *Attorney, Agent, or Firm*—Akin, Gump, Strauss, Hauer & Feld, LLP; Dwayne L. Mason

(57) ABSTRACT

The present invention relates in general to a method and apparatus for planning a pressure survey, and in particular, a method and apparatus for using a pressure survey tool so that the user may predict in advance the number of pressure tests needed to be performed in a pressure survey such that the results fall within a desired standard deviation of the pressure gradient. The present invention further relates in general to a method and apparatus for performing a pressure survey, and in particular, a process of measuring pressure gradient and standard deviation thereof for downhole fluid bearing formations using information collected from pressure survey apparatus such that the requisite amount of information is collected to ensure the measurements actually received are within the desired standard deviation of the pressure gradient.

39 Claims, 11 Drawing Sheets

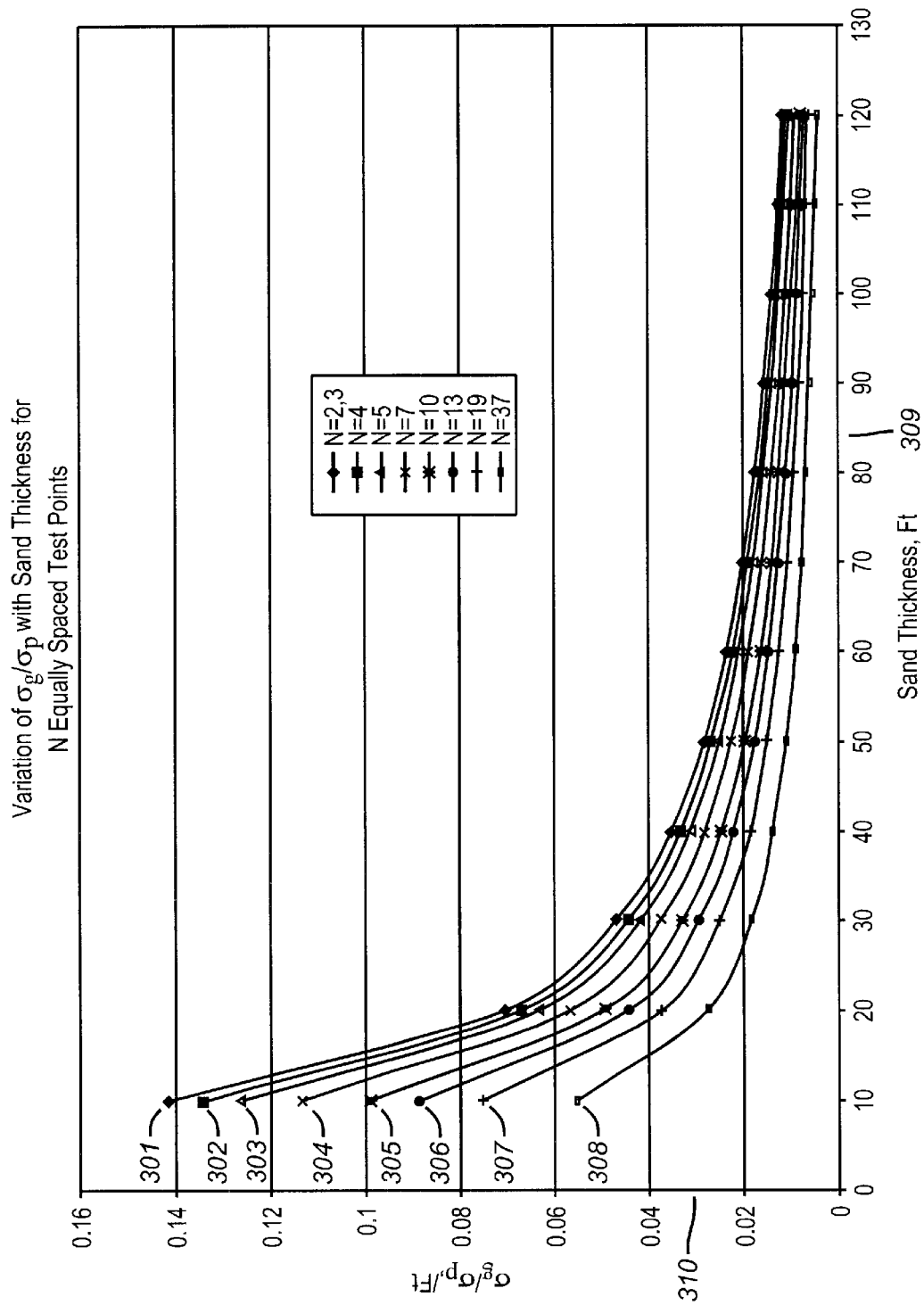

METHOD AND APPARATUS FOR PLANNING AND PERFORMING A PRESSURE SURVEY

TECHNICAL FIELD

The present invention relates in general to a method and apparatus for planning a pressure survey, and in particular, a method and apparatus for using a pressure survey tool so that the user may predict in advance the number of pressure tests needed to be performed in a pressure survey such that the results fall within a desired standard deviation of the pressure gradient. The present invention further relates in general to a method and apparatus for performing a pressure survey, and in particular, a process of measuring pressure gradient and standard deviation thereof for downhole fluid bearing formations using information collected from pressure survey apparatus such that the requisite amount of information is collected to ensure the measurements actually received are within the desired standard deviation.

BACKGROUND INFORMATION

The pressure of an earth formation and its pressure gradient are important characteristics to determine for a subsurface geological formation since, among other things, such information is utilized in reservoir calculations to determine the oil, gas, and water in place in the formation. The more accurate these calculations, the better exploitation can be made respecting both economical and technological recovery of the hydrocarbon fluids.

Currently, pressure of an earth formation is measured from within a drilled borehole using pressure survey tools such as, for example, Schlumberger's MDT (Modular Dynamic Tester) and Baker-Atlas' RCI (Reservoir Characterization Instrument). Schlumberger's MDT tool is generally described in U.S. Pat. No. 4,860,581 to Zimmerman et al., and is also further generally described in U.S. Pat. No. 5,969,241 to Auzerias, which patents are herein incorporated by reference.

A "pressure test" is the formation pressure measured at a given depth by a sonde (such as an MDT or RCI) designed to make contact with the formation and place a pressure transducer in contact with it. A "pressure survey" is a series of formation pressure tests taken at different depths of a formation (geologic zone) of interest.

To use an MDT or RCI tool, during a pressure test, the tool is lowered into a borehole, and a packer of the tool is placed against a portion of the borehole wall to isolate that portion of the formation from borehole fluids. A probe, which is part of the tool, is surrounded by the packer. The mudcake around the localized area is usually cleaned. The pressure applied at the probe is drawn down whereby the pressure at the isolated portion of the borehole wall decreases to a pressure well below that of the formation to be tested. This reduced pressure further cleans the isolated portion of the borehole wall formation (i.e., further cleaning the mudcake in a localized area). The probe then is filled with formation fluid, during the applied draw-down. The pressure gauge connected to the chamber then indicates pressure of the earth formation (the "formation pressure"). This procedure is repeated at different depths within the formation to perform the pressure survey.

FIG. 1 generally depicts a graph illustrating the change in pressure recorded by a pressure transducer over time, during a single pressure test.

In FIG. 1, the y-axis 101 indicates the pressure recorded by a pressure transducer and the x-axis 102 indicates the time during which the pressures are recorded. Prior to drawdown, the borehole pressure 103 is recorded. During drawdown 104, the pressure recorded reflects that the pressure has been reduced between the borehole wall and the transducer. The pressure is then allowed to build-up during the buildup period 105 until it reaches equilibrium. This equilibrium pressure is the formation pressure 106.

A pressure survey tool is characterized by several accuracy specifications which define its capabilities. These are usually warranted by the manufacturer in some fashion, and are verifiable by testing. Such testing is sometimes referred to as "calibration data," which calibration data testing, normally determined in a laboratory, reflects the standard performance data of the pressure transducer used to perform the pressure tests.

The accuracy specifications normally given for a pressure transducer used in the MDT and RCI tools are full scale accuracy, linearity, repeatability, and resolution. The pressure transducer is expected to work within these specifications whenever it indicates an equilibrium (stable) pressure value, such as formation pressure.

Repeatability is the specification of a pressure transducer tool associated with determining the accuracy of the gradient. Repeatability is defined as the maximum deviation between all successive measurements of the same quantity, when each of the measurements is approached from the same direction. This is the appropriate accuracy specification to apply to the analysis of the gradient, because each pressure measurement used to calculate the gradient is taken in the same direction. The gradient of a formation is the linear change of pressure as depth changes (typically expressed in psi/ft).

When a specification of repeatability is stated, usually in terms of ±X PSI, it means that all repeatability tests must yield values equal to or less than X. For example, if a transducer records a pressure of 4352.05 PSI when approached from below (as is shown in FIG. 1), and if its repeatability specification is ±0.5 PSI, all subsequent readings of the same pressure must read between 4351.55 PSI and 4352.55 PSI, if the pressure is approached from below. This establishes an error band for repeatability, within which all such measurements must fall.

In quality control work such an error band (one within which all deviations must fall) is established by the 3σ rule as reflected in Lawrence S. Aft, *Fundamentals of Industrial Quality Control*, Addison-Wesley Publishing Company, 1986. The 3σ rule establishes an error band within which theoretically 99.7% of all errors caused by random deviation will fall. In practical terms, if all pressure transducers of a certain type have repeatabilities which fall in an error band of ±X PSI, then the standard deviation of the sample of all such pressure transducers is equal to X/3 PSI.

Values of pressure gradient and standard deviation of pressure gradient are needed to evaluate the nature of formation fluids (gas, oil, water). The more accurate and traceable these values are, the better the results. Pressure surveys are very expensive. The user gains valuable knowledge if the user can plan the survey in advance, and do just as many pressure tests as are required to assure the user that its accuracy needs are met.

While pressure gradient and standard deviation of pressure gradient can presently be calculated by various known methods, it is believed there is no known method for planning a pressure survey based on desired standard deviation of gradient. Thus, there is a need for a method and apparatus to plan a pressure survey so that a pre-desired standard deviation of pressure gradient will be accurately determined beforehand.

Furthermore, there is a need to plan a pressure survey, so the user can know in advance what the standard deviation of pressure gradient will be. This information would also allow the user to increase or scale back the equipment used, so as to achieve a desired standard deviation of pressure gradient in a proper economical and technological fashion.

Furthermore, there is a need to be able to evaluate the pressure tests of the pressure survey as each pressure test is completed to determine when the pre-desired standard deviation of pressure gradient is obtained.

SUMMARY OF THE INVENTION

A method and apparatus for planning a pressure survey based on desired standard deviation of gradient has been discovered. The present invention provides values of standard deviation of pressure gradient based upon the repeatability of the pressure survey tool used to measure the pressure gradient, which calibration data is independent of the depth of the formation. Once the formation thickness is determined, the number of pressure tests to be performed in a pressure survey can be planned based upon the repeatability of the pressure survey tool to be used and the standard deviation of pressure gradient desired. Based upon this information, the user may adjust the number of pressure tests required by varying the pressure transducer to be used or the standard deviation of the pressure gradient desired for economical and technological reasons.

Furthermore, a method and apparatus for real time comparison between the standard deviation of the pressure gradient based upon the repeatability of the pressure survey tool used with the calculated standard deviation of the pressure gradient of the information recorded by the pressure survey tool during each test. As each pressure test is completed, this comparison can be updated to confirm when sufficient number of pressure tests have been performed to complete the pressure survey with results yielding a standard deviation of the pressure gradient within the parameters pre-desired.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates, a diagram reflecting a set of curves for calculating a characteristic of the pressure test survey;

DETAILED DESCRIPTION

Figure 1:
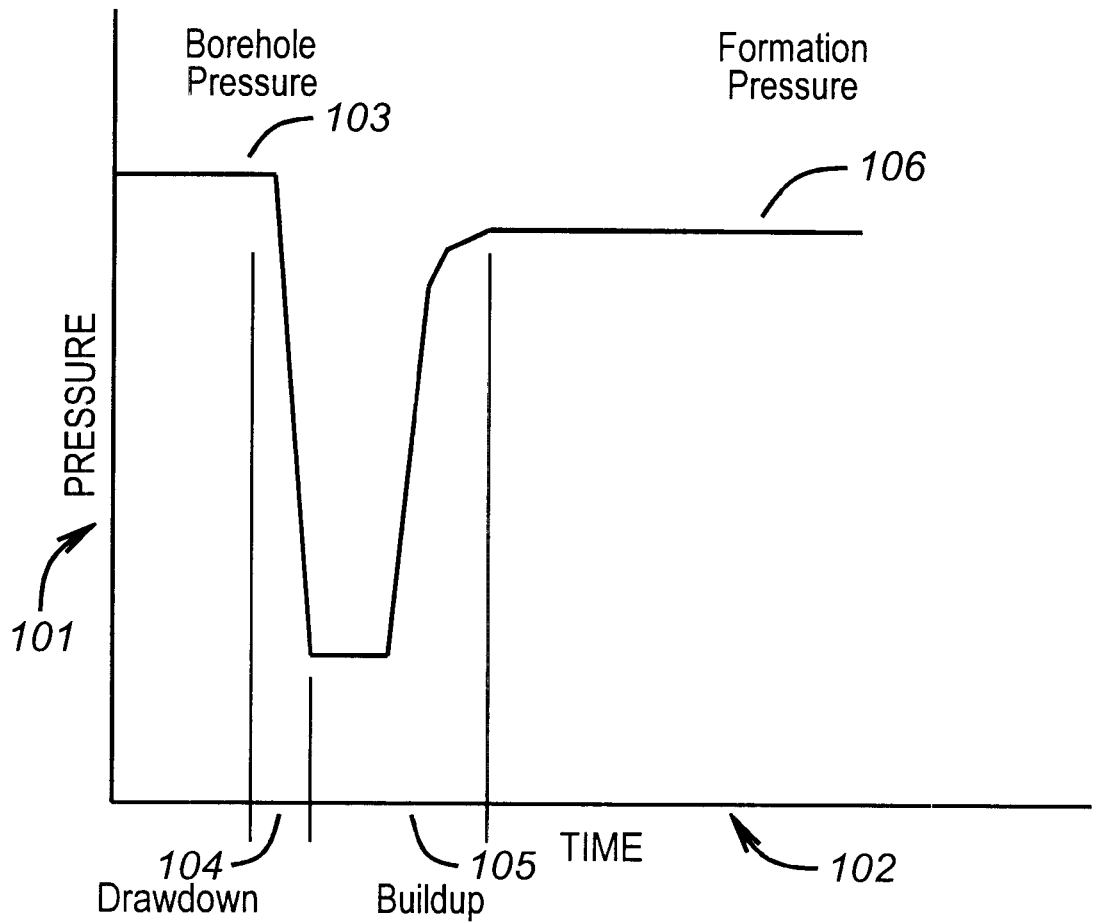
FIG. 1 illustrates the general change in pressure recorded by a pressure transducer over time.

To plan the pressure survey, the zone thickness (M) of the formation to be surveyed must be determined. For instance, as shown in Table I below, if the formation is from 9800 feet to 9830 feet, the zone thickness M would be thirty (30) feet. This zone thickness may be determined by using techniques well known in the art. Once the zone thickness is known, there are at least four characteristics that may be varied that will effect the pressure survey planned.

The first characteristic is the number of pressure tests (N) which are planned to be performed during the pressure survey. N must be at least two (so that a pressure and pressure gradient of the formation may be calculated from the actual data). N must also not get too large because performing a large number of pressure tests is uneconomical and moreover may subject the pressure survey tool to mechanical difficulties that may arise from repeated uses of the device.

The second characteristic is the depths (D) at which each of the N pressure tests are performed. For the purpose of planning, this variable may be set by uniformly distributing the depths D throughout the zone thickness M. Thus, if the zone thickness is thirty feet (between 9800 feet to 9830 feet), and seven (7) pressure tests are to be performed, the depths D would be spaced five (5) feet apart (i.e. at depths of 9800, 9805, 9810, 9815, 9820, 9825, and 9830 feet). Herein, this uniform distribution has been utilized for the purposes of planning. To the extent other types of distribution are desired, it will be obvious to those skilled in the art that the present invention may be adapted to such other types of distributions.

The third characteristic is the pressure survey tool used to conduct the test. Based upon the calibration data of the tool, most specifically the repeatability of the tool, this characteristic controls the standard deviation of the parent distribution of the pressure measurements for all the N pressure tests ($\sigma_p$). This is because, for a theoretical set of N tests, $\sigma_p$ is equal to ⅓ the repeatability of the pressure survey tool. This repeatability value is a function of the pressure survey tool and is generated by calibration data. For instance, certain pressure transducers, such as the MDT and CRI tools, have repeatabilities of 5 psi and 0.5 psi, which equates to $\sigma_p$ equal to 1.67 psi and 0.167 psi, respectively.

$\sigma_p$ represents the expected standard deviation of each reading taken during a pressure survey. This designation of $\sigma_p$ as equal to ⅓ the repeatability is accurate because of the process used by a sonde to conduct a pressure test, and because of standard quality control definitions. This results in a determination of $\sigma_p$ for any pressure transducer whose repeatability has been properly specified and proven.

The fourth characteristic is the standard deviation of the pressure gradient ($\sigma_g$) desired. The standard deviation of pressure gradient $\sigma_g$ is the value which represents a band of values within which the pressure gradient is located, with a theoretical probability of 68.3%. Thus the value of g may be determined from the parametric graph of $\sigma_g/\sigma_p$ versus sand depth, and the value of $\sigma_p$. Such a determination of $\sigma_g$ is thus traceable to specification and quality control data.

When the second characteristic is assumed to be uniform, there remain three characteristics that may be varied. Predetermining any two of these characteristic influences and controls the third. For instance, by selecting the tool used and the standard deviation of the pressure gradient desired ($\sigma_g$), the number of tests planned to be used in the pressure survey may be determined. Alternatively, if the number of tests planned and the tool has been selected, the expected standard deviation of the pressure gradient received from the test may be determined. And, further alternatively, if the number of test planned and the standard deviation of the pressure gradient desired ($\sigma_g$) has been selected, the proper tool to be used for the pressure survey may be determined.

In practice, the user usually has a fixed zone thickness, and knows the $\sigma_g$ the user desires and the $\sigma_p$ of the pressure survey tool. And thus the user typically desires to know how may pressure tests (N) the user would expect to take under those conditions to achieve the user's expectations.

The foregoing has outlined rather broadly the features and technical advantages of the present invention in order that the detailed description of the invention that follows may be better understood. Additional features and advantages of the invention will be described hereinafter which form the subject of the claims of the invention.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, details and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
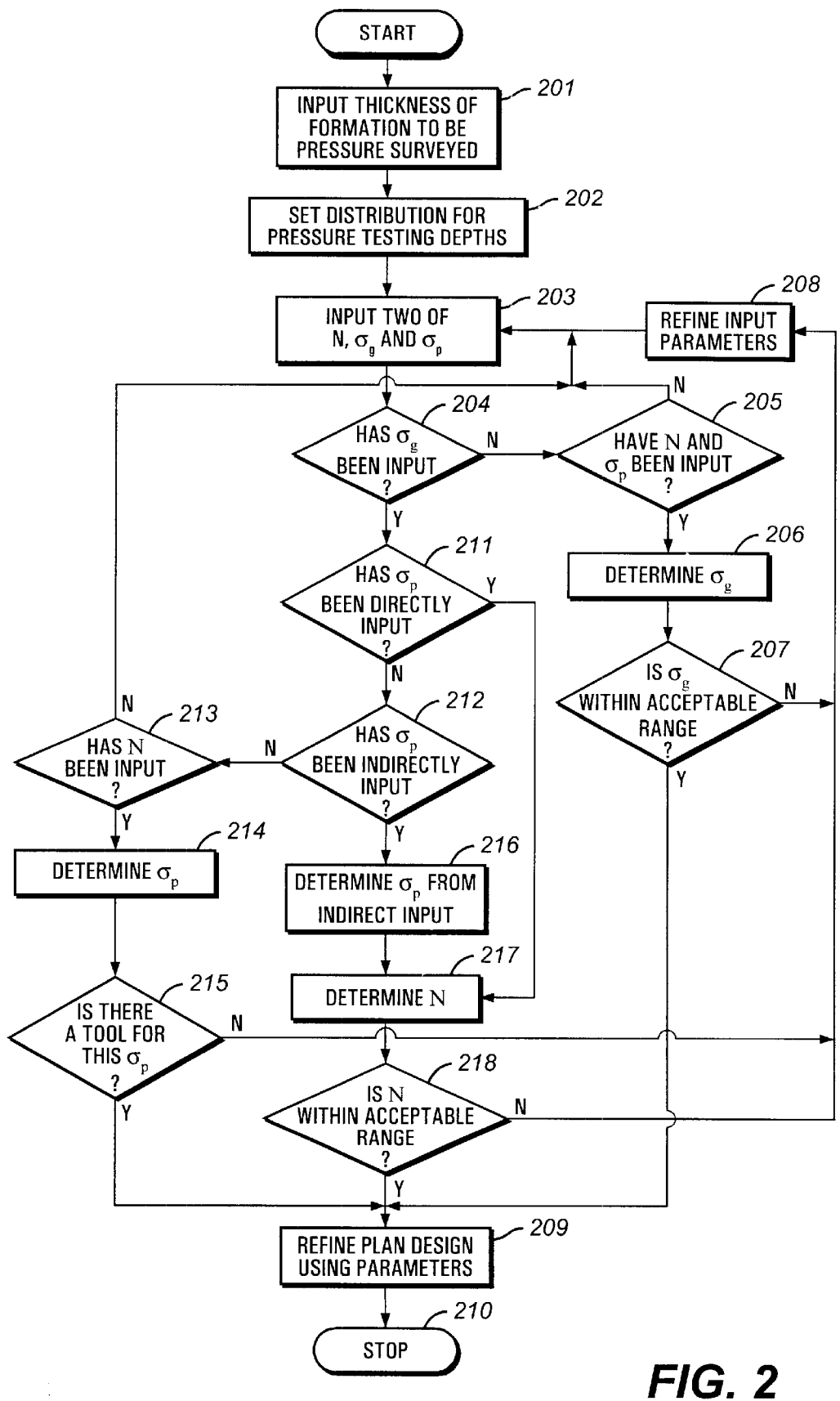
FIG. 2 illustrates, in block diagram, an embodiment of the process of the invention.

FIG. 2 represents a flow diagram illustrating an embodiment of the process of the invention by which the pressure survey is planned. The thickness of the formation M is input in step 201. The distribution for the pressure testing depths are also set in step 202. Step 202 may established by setting certain parameters (such as uniform distribution), by manually entering the pressure depths, or by random generation of these depths.

In step 203, two of the three characteristics N, $\sigma_g$, and $\sigma_p$ are input. $\sigma_p$ may be entered directly, or indirectly, such as by indicating the tool, like the MDT or RCI, to be used during the pressure tests. In step 204, it is determined whether the standard deviation of the pressure gradient, $\sigma_g$, was one of the two characteristics input. If it was not, step 205 verifies that the other two characteristics (N and up) were input. If not, the process is returned to step 203. If both characteristics N and $\sigma_p$ were input, in step 206, $\sigma_g$ is determined using the technique disclosed herein, such as by using the chart of FIG. 3.

Once $\sigma_g$, is determined, this determination of $\sigma_g$ is evaluated in step 207 to ensure that this determination is within an acceptable range for the standard deviation of pressure gradient desired. For instance, $\sigma_g$ may be too large to glean pressure readings for later use. Also, for instance, $\sigma_g$ may be too small, which would indicate that over testing may be occurring. If $\sigma_g$ is not within an acceptable range, the input parameters are adjusted in step 208, and the process is returned to step 203. If $\sigma_g$ is within an acceptable range, the pressure survey is refined in step 209, such as to include all factors (showing the tool, number of pressure depths, the depths of each pressure tests, the expected $\sigma_g$, etc.).

If in step 204, it is found that $\sigma_g$ has been input, in step 211 it is determined whether $\sigma_p$ has been directly entered. If not, it is determined in step 212 whether $\sigma_p$ has been indirectly entered (such as by indicating in step 203 the tool to be used during the pressure survey). If step 212 yields a determination that $\sigma_p$ has not been indirectly entered, step 213 determines whether N was input. Similar to step 205, this step 213 verifies that the other two characteristics (in this case N and $\sigma_g$) were input. If step 205 determines that N was not input, the process returns to step 203; otherwise the process proceeds to step 214, in which $\sigma_p$ is determined using the technique disclosed herein, such as by using the chart of FIG. 3.

Once $\sigma_p$ is determined, this determination of $\sigma_p$ is evaluated in step 215 to ensure that a tool exists to measure $\sigma_p$ at or near this measure. For instance, if $\sigma_p$ is determined to be about 0.001 psi, this standard deviation of the pressure gradient is much less than what tools such as MDT and RCI perform. On the other hand, for instance, if $\sigma_p$ is determined to be about 100 psi, it may be inefficient to use any of the existing tools for that measurement. This latter example also reflects that MDTs and RCIs that measure to within 5 psi repeatability would satisfy the criteria, and that it would be unnecessary to use the generally more expensive MDTs and RCIs that measure to within 0.5 psi repeatability.

If no tool is determined that is economically or technologically available for the determined $\sigma_p$, the input parameters are again adjusted in step 208, and the process is returned to step 203. If a tool is determined in step 208, the process proceeds to step 209, wherein it continues as described before.

If in step 211, $\sigma_p$ is found to be directly input, the process proceeds to step 217. And, if in step 212, $\sigma_p$ is found to be indirectly input, the process proceeds to step 216, wherein $\sigma_p$ is determined from the information indirectly input, and the process then proceeds to step 217. In step 217, both $\sigma_g$ and $\sigma_p$ have been input. This is viewed as the most typical situation for the present invention, where a user wants to calculate N from a given repeatability of a tool, and a given standard deviation of pressure gradient pre-desired. In step 217, N is determined using the technique disclosed herein, such as by using the chart of FIG. 3.

Once N is determined, this determination of N is evaluated in step 218 to ensure that this determination is within an acceptable range of N. For instance, N may be too large so that the number of pressure tests is cost prohibitive or exceeds the recommended number to be utilized by the tool. If N is not within an acceptable range, the input parameters are adjusted in step 208, and the process is returned to step 203. If N is within an acceptable range, the process proceeds to step 209, wherein it continues as described before.

FIG. 3 is a diagram reflecting a set of curves 301–308 for calculating N, $\sigma_g$, or $\sigma_p$, when the other two of these three characteristics have been pre-determined. The curves 301–308 of FIG. 3 were generated as described hereinafter under the assumption that the pressure testing points N were uniformly distributed throughout the sand thickness M. Such uniform distribution is defined by the pressure points being spaced apart from one another as follows:

$$\text{Distance separated} = M/(N-1) \tag{1}$$

The x-axis 309 reflects the sand thickness M, which in FIG. 3 is reflected in feet. The y-axis 310 reflects $\sigma_g/\sigma_p$, which in FIG. 3 is reflected in ft$^{-1}$. Curve 301 reflects the curve generated for N=2,3. Curve 302 reflects N=4. Curve 103 reflects N=5. Curve 304 reflects N=7. Curve 305 reflects N=10. Curve 306 reflects N=13. Curve 307 reflects N=19. And, Curve 308 reflects N=37.

The points of these curves for the chart of FIG. 3 were generated as follows. A sand thickness M was chosen (such as, for example, 30 feet). A value of N was also chosen (such as, for example 7 pressure test points). As shown below, Table I reflects such parameters for a zone between 9800 to 9830 with 7 pressure test points uniformly distributed over the interval.

TABLE 1

| Data Points (N) | Depth ($D_j$) | Depth$^2$ ($D_j^2$) |
|---|---|---|
| 1 | 9800 | 96040000 |
| 2 | 9805 | 96138025 |
| 3 | 9810 | 96236100 |
| 4 | 9815 | 96334225 |
| 5 | 9820 | 96432400 |
| 6 | 9825 | 96530625 |
| 7 | 9830 | 96628900 |
| Sum | 68705 | 674340275 |

The relationship among N, $\sigma_p$, and $\sigma_g$ can be expressed by the equation:

$$(\sigma_g/\sigma_p)^2 = \{N/[(N*(\Sigma D_j^2)-((\Sigma D_j)^2)]\}*\{1+K^2\} \quad (2)$$

where $D_j$ represents the set of N depths at which the pressure tests would be made, and
where: $K=G*\sigma_D/\sigma_p$, and
  G=gradient in psi/ft, and
  $\sigma_D$=standard deviation of depth measurement in ft Those skilled in the art will recognize that, for most cases of interest the value, $K^2$ will be very near zero (for example, if G=0.3 psi/ft, $\sigma_D$=0.08 ft, and $\sigma_p$=0.167 psi, then $K^2$=0.0206), and can be neglected.

When $K^2$ is very near zero, and can be neglected, equation (2) becomes:

$$(\sigma_g/\sigma_p)^2 = N/[(N*(\Sigma D_j^2)-((\Sigma D_j)^2)] \quad (4)$$

Substituting the values in from Table I into equation (4) yields $\sigma_g/\sigma_p$ equal to 0.03780 ft$^{-1}$. Examination of curve 304 in FIG. 3 reflects that when the sand thickness is 30 feet, this value of $\sigma_g/\sigma_p$ is received.

Due to the relationship among N, $\sigma_p$, and $\sigma_g$ expressed in equation (4) above, the actual depth points of the zone do not effect the value of $\sigma_g/\sigma_p$. Rather, it is the difference between the depth points that effect this value. In other words, if the thirty foot interval from 1000 feet to 1030 feet had been examined (rather than from 9800 feet to 9830 feet), with seven data points (distributed over 1000, 1005, 1010, 1015, 1020, 1025, and 1030), equation (4) would still yield $\sigma_g/\sigma_p$ equal to 0.03780 ft$^{-1}$. This also means that FIG. 3 is independent of the actual depths of the wellbore being evaluated.

It was from equation (4) that the curves 301–308 were generated by varying M as N was held constant.

FIG. 3 can be used to determine N, $\sigma_p$, or $\sigma_g$ as follows:

When N and $\sigma_p$ have been input for a 30 foot interval M, such as, for example, N=7 and $\sigma_p$=0.167 psi (a tool repeatability of 0.5 psi), curve 304 (or equation (4)) generates that $\sigma_g/\sigma_p$ is equal to 0.03780 ft$^{-1}$. This yields a value of $\sigma_g$ equal to 0.006312 psi/ft.

When N and $\sigma_g$ have been input for a 30 feet interval M, such as, for example, N=10 and $\sigma_g$=0.055 psi/ft, curve 305 (or equation (4)) generates that $\sigma_g/\sigma_p$ is equal to 0.03303 ft$^{-1}$. This yields a value of $\sigma_p$ equal to 1.67 psi (which is $\sigma_p$ for a tool with a repeatability of 5 psi).

When $\sigma_p$ and $\sigma_g$ have been input for a 30 feet interval M, such as, for example, $\sigma_p$=0.167 psi (a tool repeatability of 0.5 psi) and $\sigma_g$=0.00704 psi/ft, this yields an $\sigma_g/\sigma_p$ equal to 0.0422 ft$^{-1}$. From FIG. 3 (or equation (4)), those values for $\sigma_g/\sigma_p$ and M intersect at Curve 303, which represents N=5.

Accordingly, once two of N, $\sigma_p$, or $\sigma_g$ have been input, FIG. 3, equation (4), or equation (2) can be utilized for planning purposes. As noted above, if the value received is not within acceptable boundaries, the input parameters can be refined during the planning stages of the pressure survey.

Figure 3A:
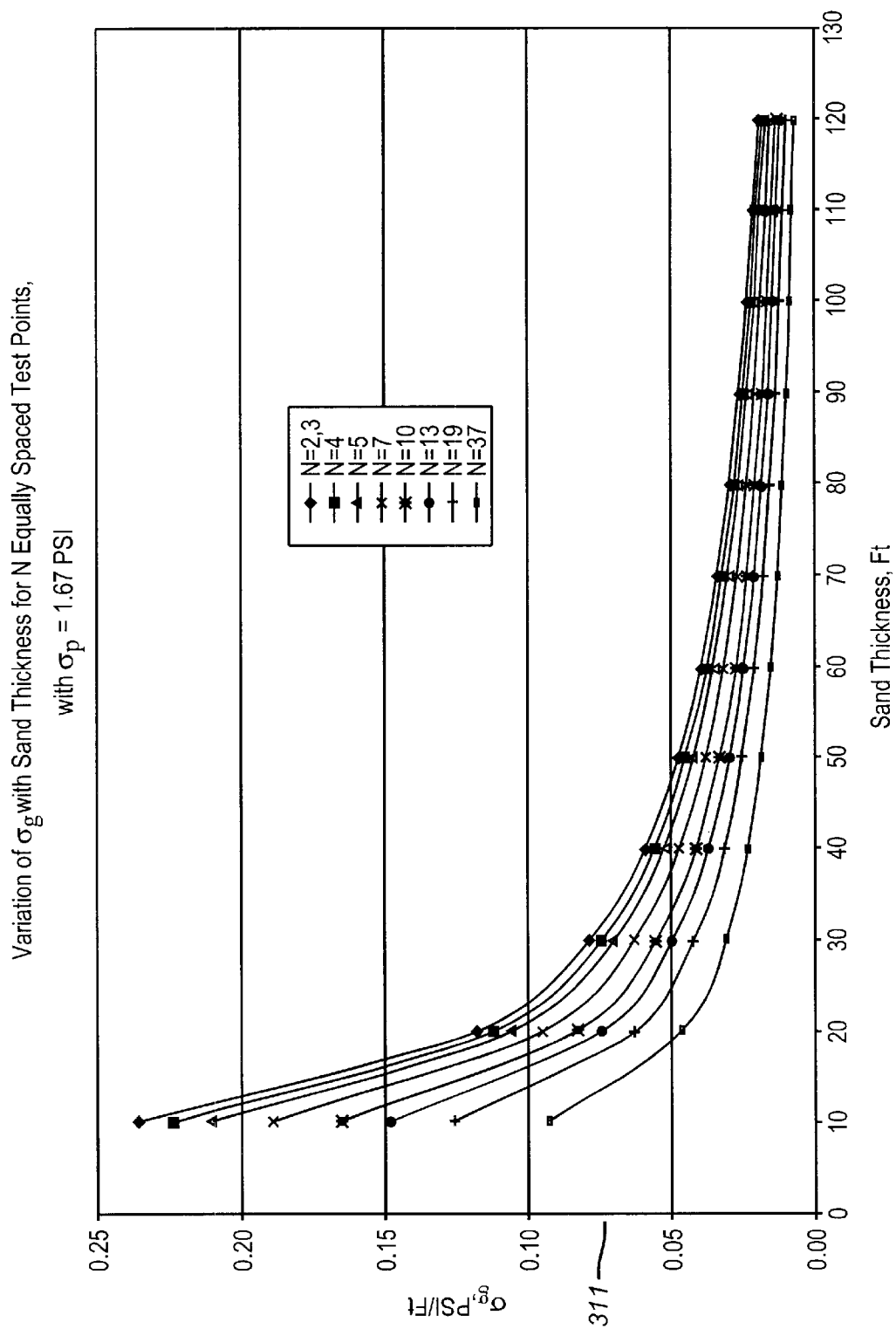
FIG. 3A illustrates an alternative diagram for the curves of FIG. 3.
Figure 3B:
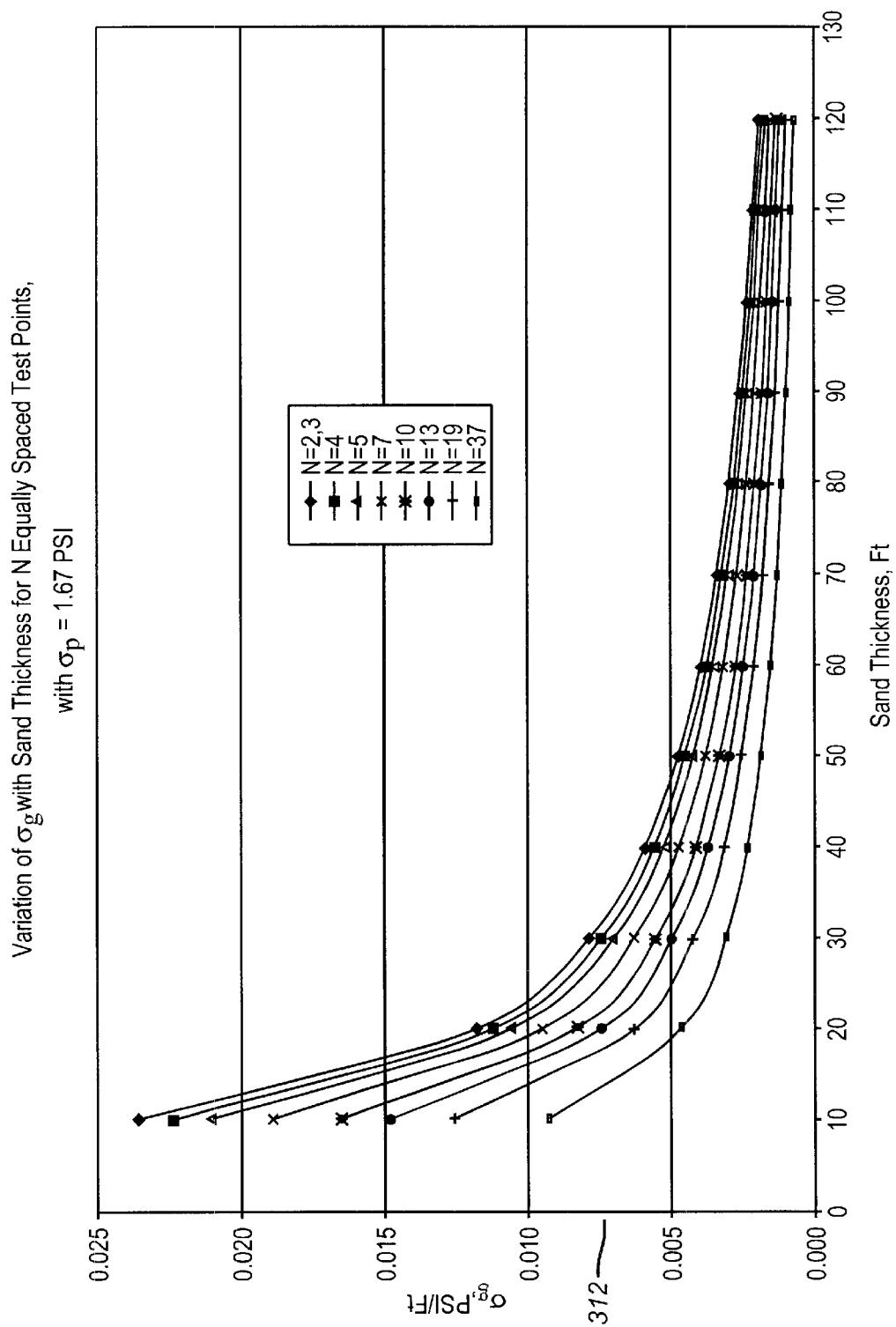
FIG. 3B illustrates a second alternative diagram for the curves of FIG. 3.

FIGS. 3A and 3B are alternate diagrams for the curves of FIG. 3 in that the value $\sigma_p$ equal to 1.67 psi and 0.167 psi, respectively, have been set for these Figures. Since $\sigma_p$ is set, the curves of FIG. 3 are re-plotted so that the y-axis 311 and y-axis 312, of FIGS. 3A and 3B respectively, now represent $\sigma_g$ in psi/ft.

Figure 4:
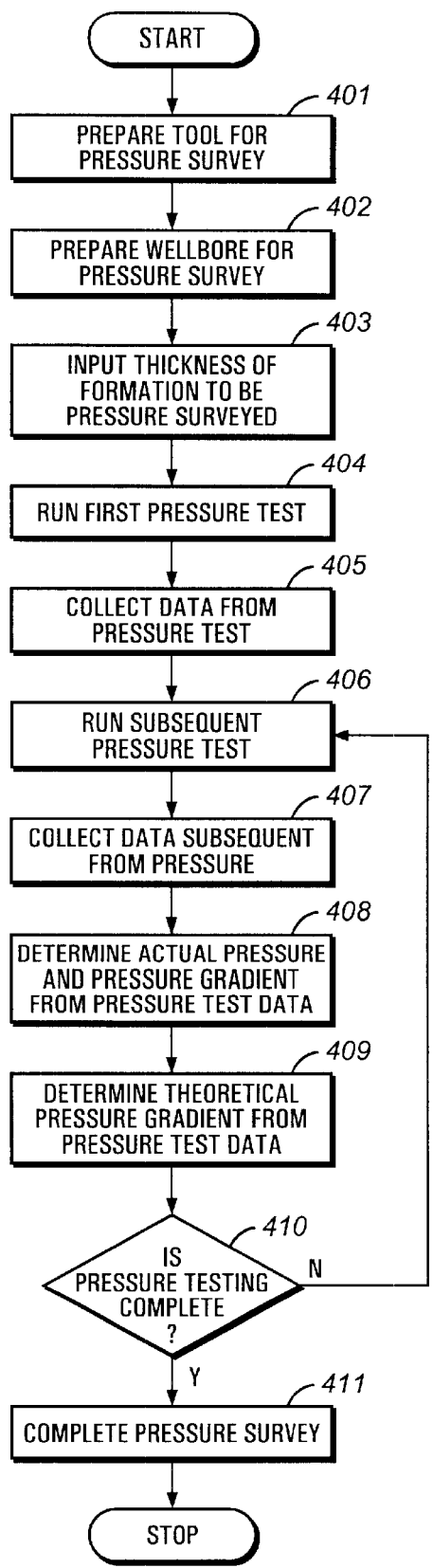
FIG. 4 illustrates, in block diagram form, a second embodiment of the process of the invention.

FIG. 4 represents a flow diagram illustrating a second embodiment of the process of the invention by which the pressure survey is performed using a process to determine that a proper number of pressure testing information have been obtained that show the pressure survey is complete.

In step 401, the pressure survey tool to be used is selected (possibly by the process shown above in FIG. 2), which includes compiling the tool's calibration data, such as its repeatability. Such repeatability may be checked prior to the actual use of the tool in the wellbore.

In step 402, the wellbore is also prepared for the pressure survey. Reasons for such preparation include obtaining better assurance that the tool, such as an MDT or RCI tool, will properly seat during the testing period.

In step 403, information about the formation, such as the thickness of the formation are input. The formation information may be obtained by procedures well known by those skilled in the art to which the present invention is directed.

In step 404, the first pressure test is run using the pressure survey tool. During this step, the tool is typically run down to the formation on a wireline, which wireline will transmit to the surface the information collected during the test to the surface. The tool is run to formation depth and then seated at a measured depth. The tool is then operated so that the formation pressure (as indicated in FIG. 1) is received.

In step 405, the data received from the first pressure test collected. Data include the depth of the test point and the pressure measured. Such collection of data may be included using the system illustrated in FIGS. 5 and 5A, which will be described in further detail hereinafter.

In step 406, a subsequent pressure test is run. Generally, this is performed at a depth distinct from that of the earlier test. Since a formation pressure and a pressure gradient are typically desired, it is necessary that at least two points be recorded for the pressure gradient to be calculated. In step 407, the data received from the subsequent pressure test is collected with the data collected from the information collected from the first test.

As discussed in more detail below, in step 408, the data collected is analyzed to determine the actual pressure and pressure gradient from the pressure test data. Likewise, in step 409, the theoretical standard deviation of pressure gradient from the pressure gradient data is determined.

In step 410, the data is reviewed to determine whether the pressure testing is complete, in accordance with pre-planned objectives, so that the pressure testing for the survey is complete. If not, the process is returned to step 406 to perform a further test to add information to that gathered by the first and subsequent tests. If, the pressure test is complete, in step 411, the pressure survey is completed. From there the tool may be moved to another formation depth for testing, or removed from the wellbore entirely.

With respect to the data collected, columns 1, 2, and 3 of Table II reflect data that could be collected from a pressure test survey.

TABLE II

| Data Point (N) | Depth ($D_j$) (feet) | Pres. Rec (psi) | Pres Grad (psi/ft) | Actual $\sigma_g$ (psi/ft) | Theoretical $\sigma_g$ (psi/ft) |
|---|---|---|---|---|---|
| 1 | 9800 | 4214.1 | | | |
| 2 | 9802 | 4214.8 | 0.3500 | 0 | 0.1181 |
| 3 | 9805 | 4215.7 | 0.3184 | 0.01367 | 0.04692 |
| 4 | 9811 | 4217.9 | 0.3442 | 0.01356 | 0.02010 |
| 5 | 9814 | 4218.9 | 0.3445 | 0.009481 | 0.01405 |
| 6 | 9817 | 4219.9 | 0.3433 | 0.007494 | 0.01090 |
| 7 | 9820 | 4220.9 | 0.3420 | 0.006363 | 0.008865 |
| 8 | 9821 | 4221.3 | 0.3427 | 0.005700 | 0.007757 |
| 9 | 9824 | 4222.3 | 0.3425 | 0.004981 | 0.006773 |
| 10 | 9829 | 4224.1 | 0.3440 | 0.004798 | 0.005734 |
| 11 | 9830 | 4224.5 | 0.3454 | 0.005123 | 0.005100 |

Figure 6:
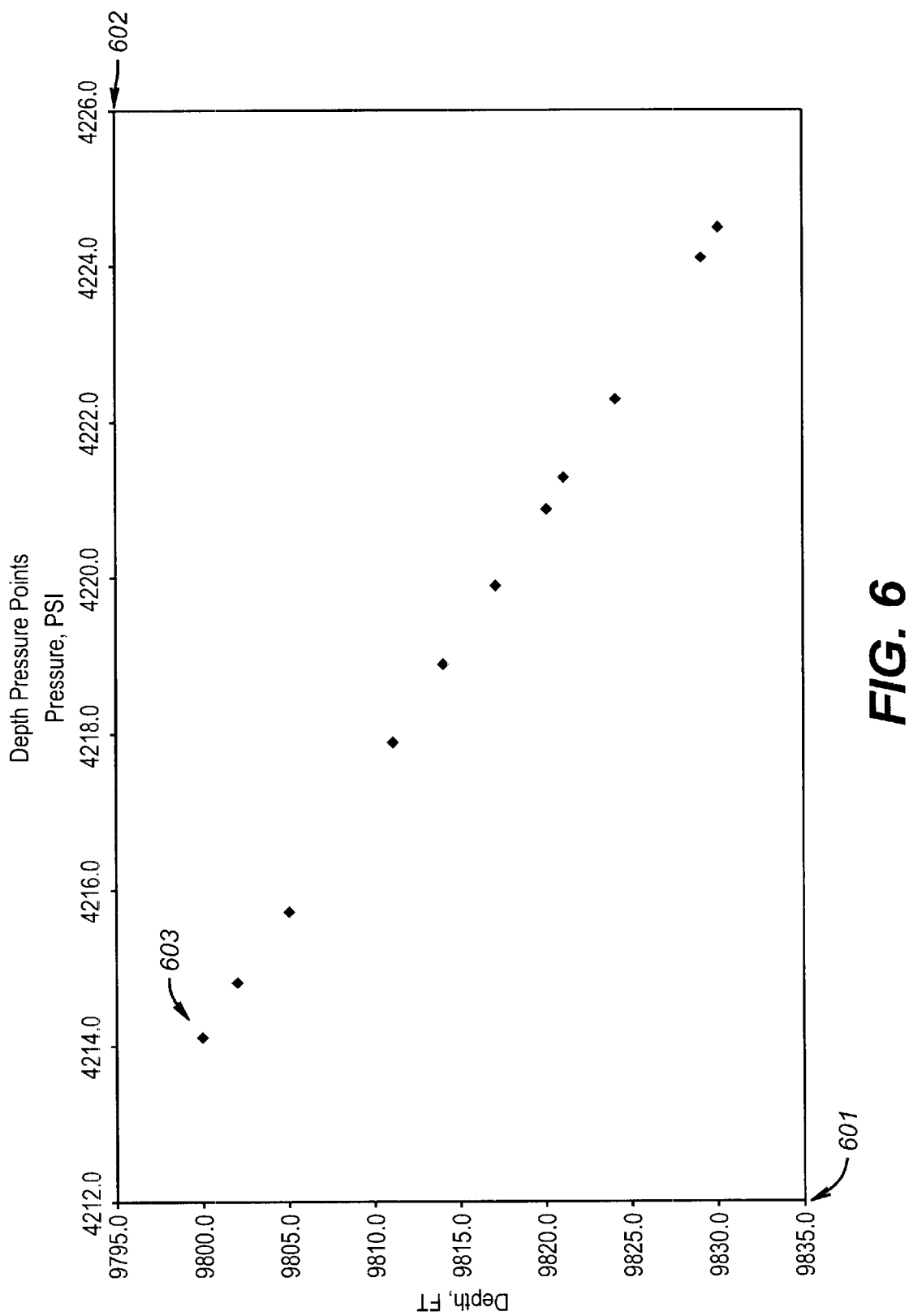
FIG. 6 illustrates, a diagram showing a comparison of depths versus pressures.

FIG. 6 is a diagram reflecting the depth and pressure points 603 as reflected in Table III. The y-axis 601 indicates the depth at which the tests are taken. The x-axis 602 indicates the pressures reflected at those depths.

As reflected in Table II in columns 4, 5, and 6, the pressure gradient, actual $\sigma_g$, and theoretical $\sigma_g$ appearing on each line of the table are determined by analyzing the data points on that line as well as all prior lines of Table II. It is for that reason that no pressure gradient, actual $\sigma_g$, and theoretical $\sigma_g$ appear until the second line.

The actual pressure gradient is determined by utilizing a least squares method to calculate the best fit of a line through the pressures recorded verses depth. For instance, for the first three test points shown in Table II, pressures of 4214.1 psi, 4214.8 psi, and 4215.7 psi are reflected corresponding to depths 9800, 9802, and 9805 feet, respectively.

The best fitting line through these three points is Pressure=(0.3184*Depth)+1093.6. The slope of the line is the pressure gradient (0.3184 psi/ft), which is reflected in the fourth column, third line of Table II. Using this best fitting line, pressures of 4213.9 psi, 4214.6 psi, and 4215.5 psi correspond to depths of depths of 9800, 9802, and 9805 feet. Comparing these pressures with the pressures indicated in Table II and using well known standard deviation principals, this leads to a standard deviation of the pressure gradient (the actual $\sigma_g$) of 0.01367 psi, which is reflected in the fifth column, third line of Table II.

Figure 7:
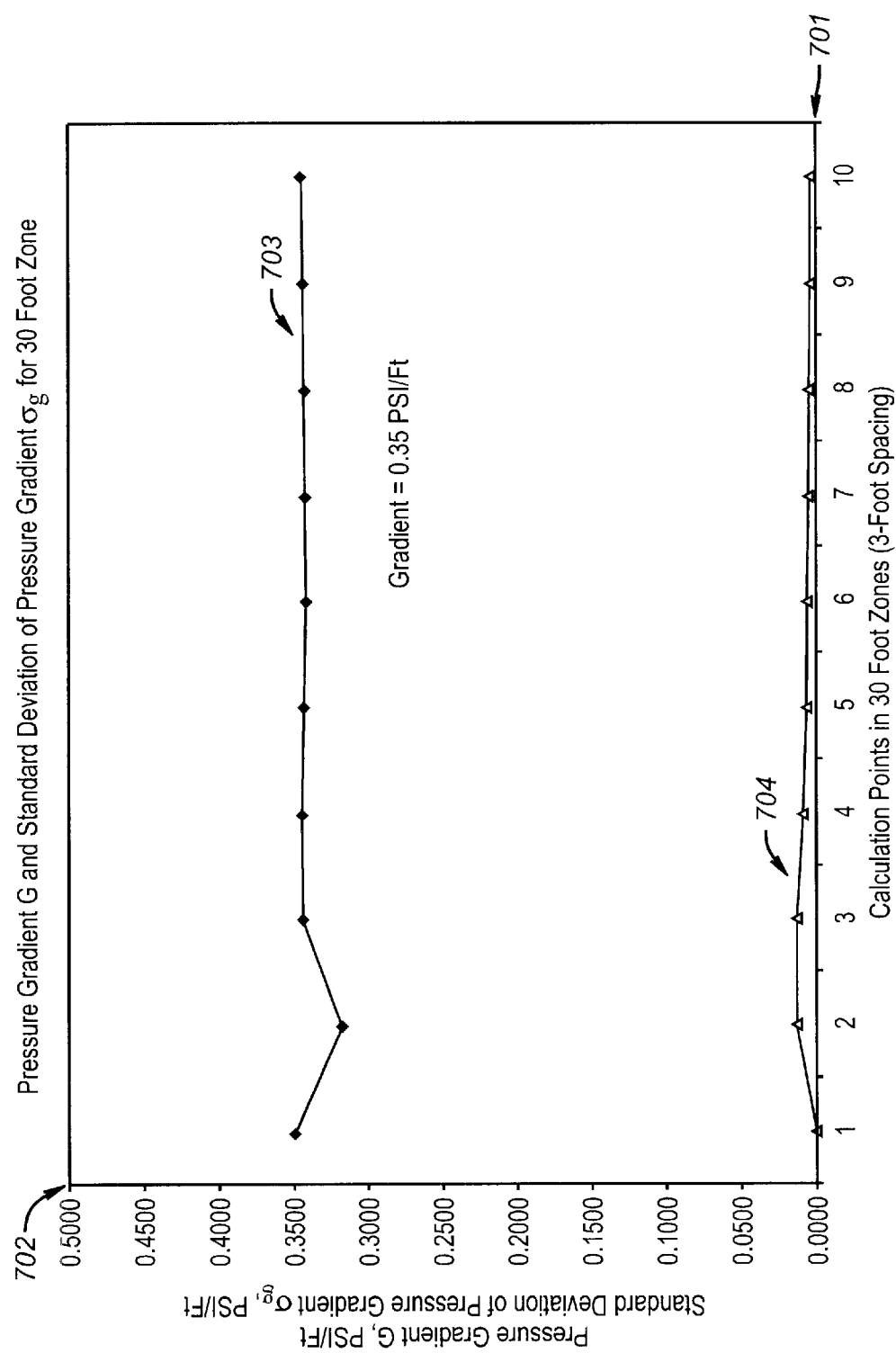
FIG. 7 illustrates, a diagram showing calculated pressure gradients and standard deviations versus calculation points measured.

FIG. 7 is a diagram reflecting the calculation points of Table II verses the pressure gradient and standard deviation of the pressure gradient received by the data cumulated at that calculation point as shown in Table II. The x-axis 701 illustrates the calculation points and the y-axis 702 illustrates both the pressure gradient and standard deviation of the pressure gradient in psi/ft. Curve 703 represents the actual pressure gradient. Curve 704 represents the actual $\sigma_g$.

With respect to the theoretical $\sigma_g$, this is calculated by using Equation (4) above for depths of 9800, 9802, and 9805. The repeatability of the tool would be 0.5 psi (which calculates to a $\sigma_g$ of 0.167 psi). For depths of 9800, 9802, and 9805 feet using this tool, the theoretical $\sigma_g$ would be 0.04692 psi, which is reflected in the sixth column, third line three of Table II.

Convergence of actual and theoretical $\sigma_g$ is an indication that adequate testing points have occurred so that the testing for the pressure survey is complete. While not required, generally, the theoretical $\sigma_g$ is greater than the actual $\sigma_g$, and the actual $\sigma_g$ will converge with the theoretical $\sigma_g$ from below. Such convergence is reflected in FIG. 8.

Figure 8:
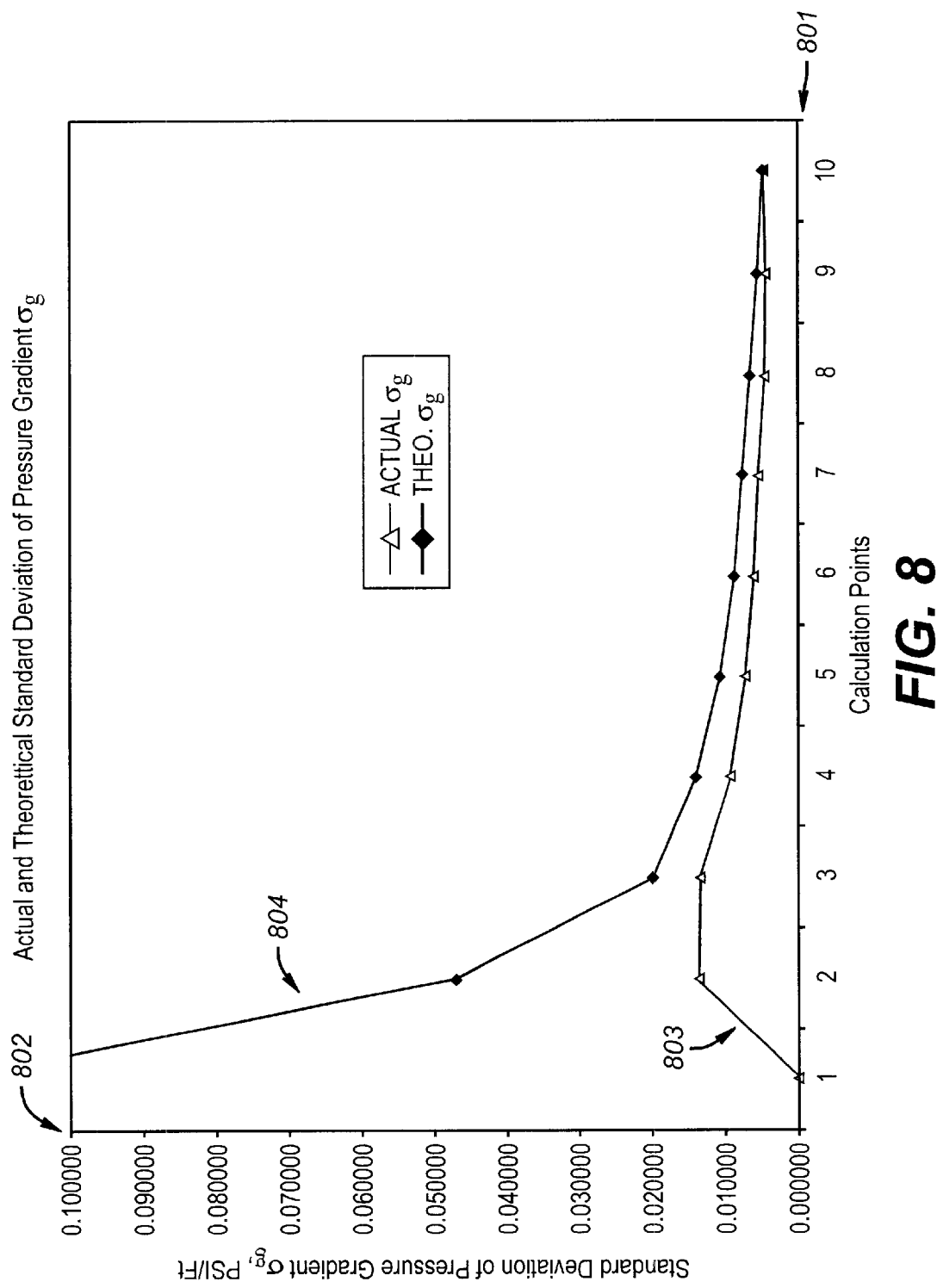
FIG. 8 illustrates, a graph showing the correspondence of actual and theoretical standard deviations of pressure gradients.

FIG. 8 is a diagram reflecting the convergence of the actual and theoretical $\sigma_g$ as reflected in Table II. The x-axis 801 illustrates the calculation points, and the y-axis 802 illustrates the standard deviation of the pressure gradient in psi/ft. Curve 803 represents the actual $\sigma_g$. Curve 804 represents the theoretical $\sigma_g$.

Figure 5:
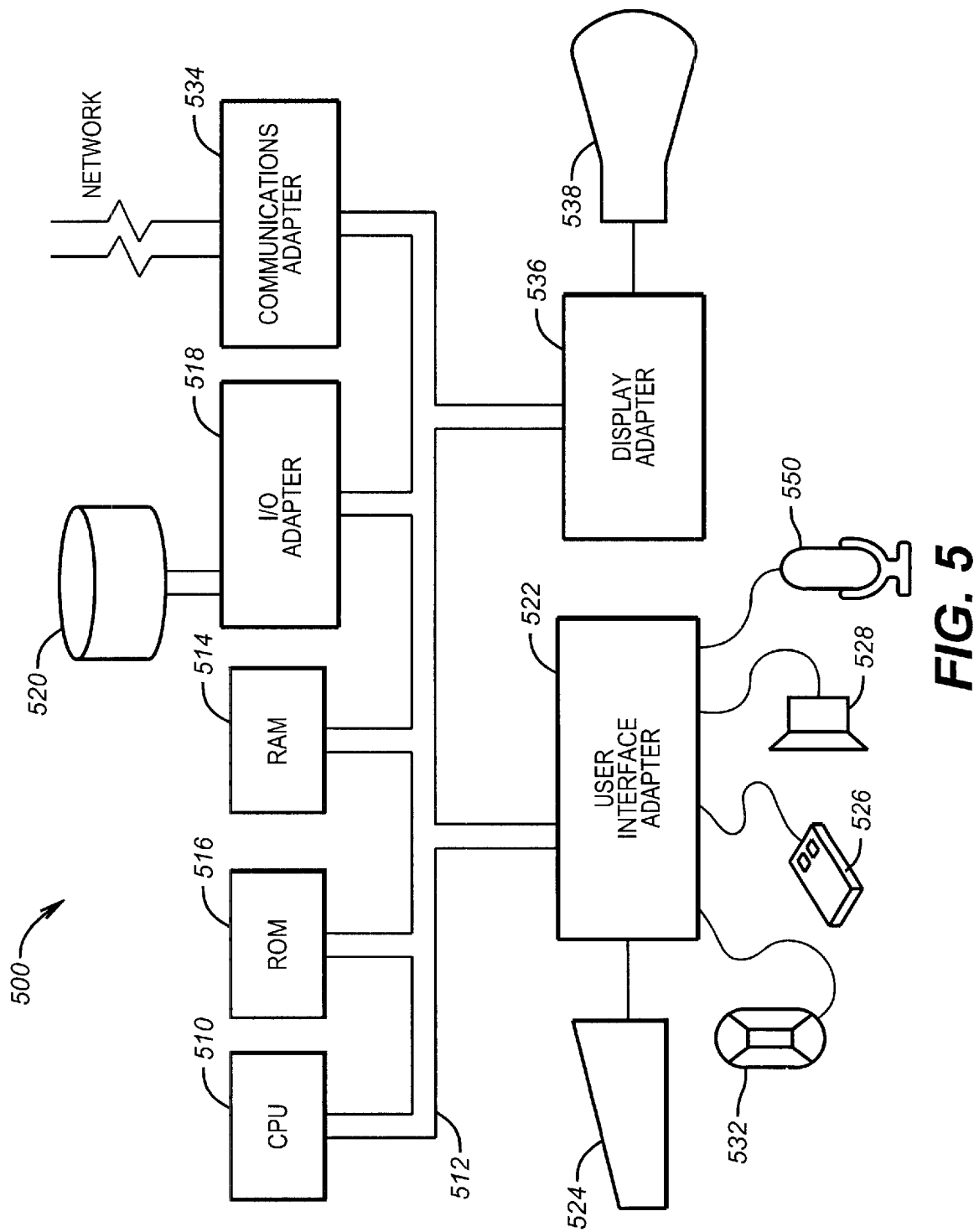
FIG. 5 illustrates, in block diagram form, an embodiment of the apparatus of the invention.

Referring to FIG. 5, an example is shown of a data processing system 500 that may be used for the present invention. The system has a central processing unit (CPU) 510. The CPU 510 is coupled to various other components by system bus 512. Read only memory ("ROM") 516 is coupled to the system bus 512 and includes a basic input/output system ("BIOS") that controls certain basic functions of the data processing system 500. Random access memory ("RAM") 514, I/O adapter 518, and communications adapter 534 are also coupled to the system bus 512. I/O adapter 518 may be a small computer system interface ("SCSI") adapter that communicates with a disk storage device 520. Communications adapter 534 interconnects bus 512 with an outside network enabling the data processing system to communication with other such systems. Input/Output devices are also connected to system bus 512 via user interface adapter 522 and display adapter 536. Keyboard 524, track ball 532, mouse 526 and speaker 528 are all interconnected to bus 512 via user interface adapter 522. Display monitor 538 is connected to system bus 512 by display adapter 536. In this manner, a user is capable of inputting to the system throughout the keyboard 524, trackball 532 or mouse 526 and receiving output from the system via speaker 528 and display 538. Additionally, an operating system is used to coordinate the functions of the various components shown in FIG. 5.

Preferred implementations of the invention include implementations as a computer system programmed to execute the method or methods described herein, and as a computer program product. According to the computer system implementation, sets of instructions for executing the method or methods are resident in the random access memory 514 of one or more computer systems configured generally as described above. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological or some other physical change. While it is convenient to describe the invention in terms of instructions, symbols, characters, or the like, the reader should remember that all of these and similar terms should be associated with the appropriate physical elements.

Figure 5A:
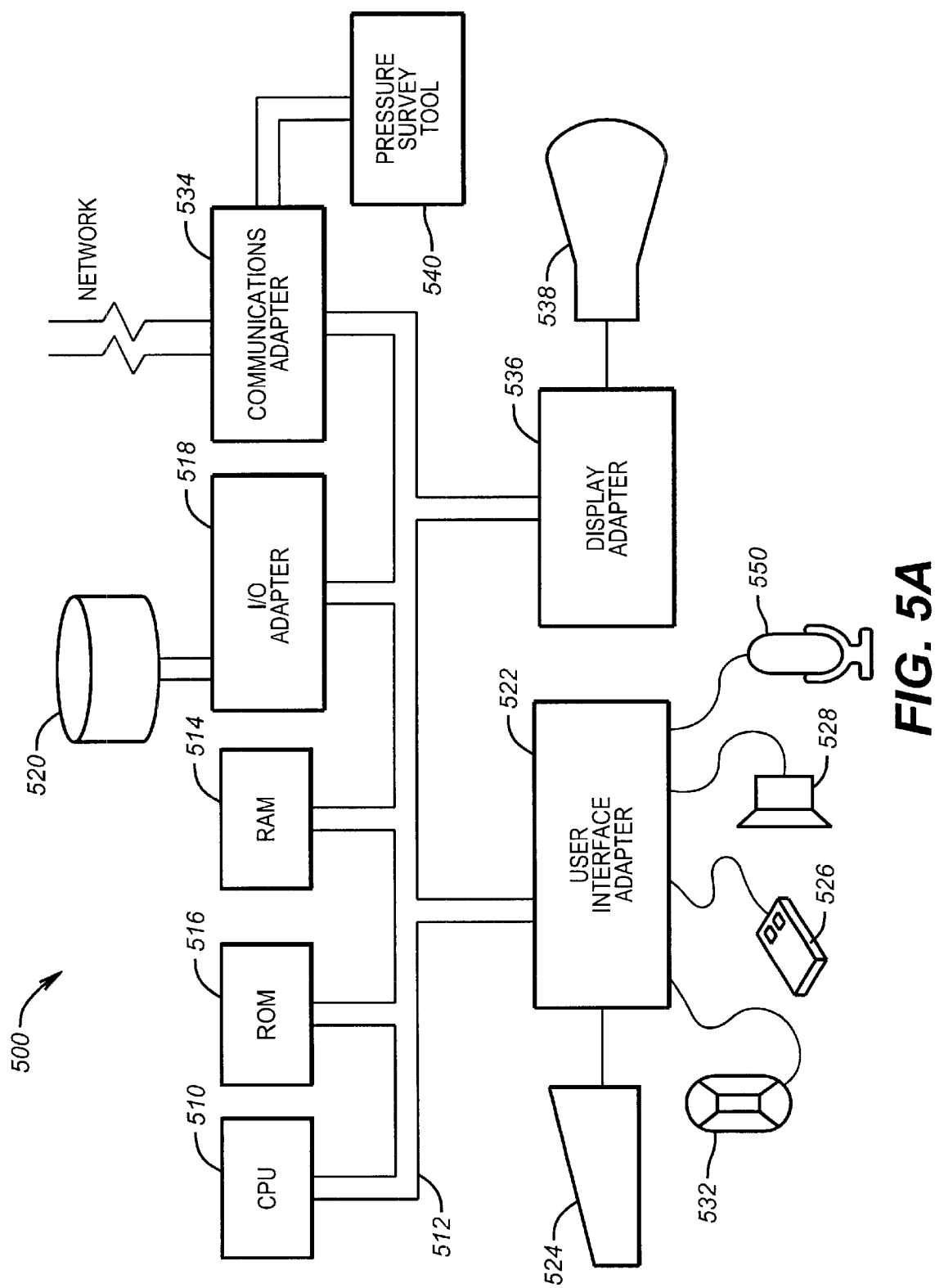
FIG. 5A illustrates, in block diagram form, a second embodiment of the apparatus of the invention.

FIG. 5A shows an alternate embodiment of the invention in which the data processing system 500 may be used in communication with a pressure survey tool 540, such as an MDT or RCI, so that the output of the tool 540 may be received by the data processing system. Tool 540 may be in communication with data processing system 500 by coupling the tool 540 with the communications adapter 534.

Note that the invention may describe terms such as comparing, validating, selecting, identifying, or other terms that could be associated with a human operator. The operations described may be, machine operations processing electrical signals to generate other electrical signals.

While the preferred embodiments of the present invention and their advantages have been disclosed in the above detailed description, the invention is not limited thereto, but only by the spirit and scope of the appended claims.

What is claimed is:

1. A method for planning a pressure survey for a geological formation comprising the steps of:
   (a) determining a zone thickness for the geological formation to be surveyed;
   (b) selecting a first desired characteristic of the pressure survey selected from a desired characteristic group consisting essentially of (i) the number of test points within the zone at which to conduct pressure tests during the pressure survey, (ii) a standard deviation of a pressure gradient, and (iii) a standard deviation for measurements of a pressure survey tool, wherein the standard deviation for the measurements is related to the repeatability of the pressure survey tool;
   (c) selecting a second desired characteristic of the pressure survey tool from the characteristic group, wherein the first characteristic and the second characteristic are selected such that exactly one remaining characteristic remains in the characteristic group; and
   (d) determining the remaining characteristic of the pressure survey based upon the first desired characteristic, the second desired characteristic, and the zone thickness.

2. The method of claim 1 further comprising the step of:
   (a) evaluating the remaining characteristic to determine the viability of the remaining characteristic;
   (b) if the remaining characteristic is determined not to be viable,
      (i) selecting a revised first desired characteristic and a revised second desired characteristic, wherein at least one of the revised first desired characteristic and the revised second desired characteristic differ from the first desired characteristic and second desired characteristic, respectively; and
      (ii) re-determining the remaining characteristic of the pressure survey based upon the revised first desired characteristic, the revised second desired characteristic, and the zone thickness; and
   (c) if the remaining characteristic has been re-determined in step (b)(ii), repeating steps (a)–(b).

3. The method of claim 1 further comprising the step of defining a test distribution system by which the number of test points are to be distributed throughout the zone.

4. The method of claim 3 wherein the test points are distributed uniformly throughout the zone.

5. The method of claim 1 wherein:
   (a) the standard deviation for measurement is determined based upon the desired number of test points within the zone at which to conduct pressure tests during the pressure survey and upon the desired standard deviation of the pressure gradient;
   (b) the pressure survey tool is selected based upon the repeatability of the pressure survey tool and the standard deviation for measurement.

6. The method of claim 1, wherein the standard deviation of the pressure gradient is determined based upon the desired number of test points within the zone at which to conduct pressure tests during the pressure survey and upon the desired standard deviation for measurement.

7. The method of claim 6 further comprising the steps of:
   (a) selecting the pressure survey tool;
   (b) measuring the repeatability of the pressure survey tool;
   (c) determining the desired standard deviation for measurement based upon the repeatability of the pressure survey tool.

8. The method of claim 1 wherein: the number of test points within the zone at which to conduct pressure tests during the pressure survey is determined based upon the desired standard deviation of the pressure gradient and the desired standard deviation for measurement.

9. The method of claim 8 further wherein the number of test points given is expressed as a function of the depths at which the pressure tests are to be performed.

10. The method of claim 9 further comprising the steps of
    (a) selecting the pressure survey tool;
    (b) measuring the repeatability of the pressure survey tool;
    (c) determining the desired standard deviation for measurement based upon the repeatability of the pressure survey tool.

11. The method of claim 1 wherein:
    (a) a central processing unit receives information selecting the first desired characteristic and the second desired characteristic;
    (b) a central processing unit receives information indicating the zone thickness;
    (c) a central processing unit generates the remaining characteristic based upon the first desired characteristic, the second desired characteristic, and the zone thickness;
    (d) transmitting the remaining characteristic from the central processing unit such that a pressure survey plan incorporates the remaining characteristic.

12. The method of claim 11 wherein, if the remaining characteristic is the standard deviation of measurement, the remaining characteristic is transmitted by identifying the pressure survey tool.

13. The method of claim 11 wherein, if the standard deviation of measurement is either the first desired characteristic or the second desired characteristic, the central processing unit receives the identity of the pressure survey tool so that, based upon the repeatability of the pressure survey tool, the central processing unit generates the standard deviation of measurement.

14. The method of claim 11 wherein, if the remaining characteristic is the number of test points, the number of test points are transmitted from the central processing unit by identifying the depths at which the pressure tests are to be performed.

15. The method of claim 14 wherein the central processing unit receives the identity of the pressure survey tool so that, based upon the repeatability of the pressure survey tool, the central processing unit generates the standard deviation of measurement.

16. A computer program product embodied in a tangible storage medium, said program product including a program of instructions for planning a pressure survey for a geological formation comprising the steps of:
    (a) receiving a zone thickness for the geological formation;
    (b) receiving a first desired characteristic of the pressure survey selected from a desired characteristic group consisting essentially of (i) the number of test points within the zone at which to conduct pressure tests during the pressure survey, (ii) a standard deviation of a pressure gradient, and (iii) a standard deviation for measurements of a pressure survey tool, wherein the standard deviation for the measurements is related to the repeatability of the pressure survey tool;

(c) receiving a second desired characteristic of the pressure survey tool from the characteristic group, wherein the first characteristic and the second characteristic are selected such that exactly one remaining characteristic remains in the characteristic group; and (d) determining the remaining characteristic of the pressure survey based upon the first characteristic and the second characteristic.

17. The program product of claim 16 further including instructions for performing the steps of:

(a) evaluating the remaining characteristic to determine the viability of the remaining characteristic;

(b) if the remaining characteristic is determined not to be viable,
 (i) selecting a revised first desired characteristic and a revised second desired characteristic, wherein at least one of the revised first desired characteristic and revised second desired characteristic are unique from the first desired characteristic and second desired characteristic, respectively; and
 (ii) re-determining the remaining characteristic of the pressure survey based upon the revised first desired characteristic, the revised second desired characteristic, and the zone thickness; and (c) if the remaining characteristic has been re-determined in step (b)(ii), repeating steps (a)–(b).

18. The program product of claim 16 wherein the number of test points within the zone at which to conduct pressure tests during the pressure survey is determined based upon the desired standard deviation of the pressure gradient and the desired standard deviation for measurement.

19. The program product of claim 18 wherein the number of test points given is expressed as a function of the depths at which the pressure tests are to be performed.

20. The program product of claim 18 further including instructions for performing the steps of:

(a) receiving an identity of a pressure survey tool; and (b) determining the desired standard deviation for measurement based upon repeatability of the identified pressure survey tool.

21. An apparatus for planning a pressure survey for a geological formation comprising:

(a) circuitry operable for receiving a zone thickness for the geological formation to be surveyed;

(b) circuitry operable for selecting a first desired characteristic of the pressure survey selected from a desired characteristic group consisting essentially of (i) the number of test points within the zone at which to conduct pressure tests during the pressure survey, (ii) a standard deviation of a pressure gradient, and (iii) a standard deviation for measurements of a pressure survey tool, wherein the standard deviation for the measurements is related to the repeatability of the pressure survey tool;

(c) circuitry operable for selecting a second desired characteristic of the pressure survey tool from the characteristic group, wherein the first characteristic and the second characteristic are selected such that exactly one remaining characteristic remains in the characteristic group; and (d) circuitry operable for determining the remaining characteristic of the pressure survey based upon the first desired characteristic, the second desired characteristic, and the zone thickness.

22. The apparatus of claim 21 further including:

(a) circuitry operable for evaluating the remaining characteristic to determine the viability of the remaining characteristic;

(b) circuitry operable for,
 (i) selecting a revised first desired characteristic and a revised second desired characteristic when the remaining characteristic is determined not to be viable, wherein at least one of the revised first desired characteristic and revised second desired characteristic are unique from the first desired characteristic and second desired characteristic, respectively; and
 (ii) re-determining the remaining characteristic of the pressure survey based upon the revised first desired characteristic, the revised second desired characteristic, and the zone thickness; and (c) circuitry operable for repeating the operation of the circuitry operable for the steps (a)–(b) when the remaining characteristic has been re-determined by operation of the circuitry for the step (b)(ii).

23. The apparatus of claim 21 wherein the number of test points within the zone at which to conduct pressure tests during the pressure survey is determined based upon the desired standard deviation of the pressure gradient and the desired standard deviation for measurement.

24. The apparatus of claim 23 wherein the number of test points given is expressed as a function of the depths at which the pressure tests are to be performed.

25. The apparatus of claim 23 further comprising:

(a) circuitry operable for receiving an identity of a pressure survey tool; and (b) circuitry operable for determining the desired standard deviation for measurement based upon the repeatability of the identified pressure survey tool.

26. A method for performing a pressure survey for a geological formation comprising the steps of:

(a) selecting a pressure survey tool, wherein the pressure survey tool has a measured repeatability;

(b) generating a set of pressure and depth data by
 (i) using said pressure survey tool to measure a first pressure of the geological formation at a first depth;
 (ii) using said pressure survey tool to measure a subsequent pressure of the geological formation at a subsequent depth;

(c) determining an actual pressure gradient and an actual standard deviation of pressure gradient based upon the set of pressure and depth data; and (d) determining a theoretical standard deviation of pressure gradient based upon the depth data in the set of pressure and depth data and the repeatability of the pressure survey tool.

27. The method of claim 26 further comprising:

(a) comparing the actual standard deviation of pressure gradient and the theoretical standard deviation of pressure gradient to determine whether the pressure testing is complete;

(b) if the pressure survey is not complete,
 (i) using said pressure survey tool to measure an additional pressure of the geological formation at a measured depth;

(ii) revising said set of pressure and depth data using additional pressure and measured depth;

(iii) revising the actual pressure gradient and the actual standard deviation of pressure gradient based upon the revised set of pressure and depth data; and (iv) revising the revised theoretical standard deviation of pressure gradient based upon the depth data in the revised set of pressure and depth data and the repeatability of the pressure survey tool;

(c) if the actual pressure gradient, the actual standard deviation of pressure gradient, and theoretical standard deviation has been redetermined in steps (b)(iii)–(iv), repeating steps (a)–(b).

28. The method of claim 26 further comprising the step of using the process of claim 1 when selecting the pressure survey tool.

29. The method of claim 27 further comprising the step of using the process of claim 1 when selecting the pressure survey tool.

30. The method of claim 27 further comprising the step of using the process of claim 2 when selecting the pressure survey tool.

31. A computer program product embodied in a tangible storage medium, said program product including a program of instructions for performing a pressure survey for a geological formation comprising the steps of:

(a) selecting a pressure survey tool, wherein the pressure survey tool has a measured repeatability;

(b) generating a set of pressure and depth data by
(i) using said pressure survey tool to measure a first pressure of the geological formation at a first depth;
(ii) using said pressure survey tool to measure a subsequent pressure of the geological formation at a subsequent depth;

(c) determining an actual pressure gradient and an actual standard deviation of pressure gradient based upon the set of pressure and depth data; and (d) determining a theoretical standard deviation of pressure gradient based upon the depth data in the set of pressure and depth data and the repeatability of the pressure survey tool.

32. The program product of claim 31 further including instructions for performing the steps of:

(a) comparing the actual standard deviation of pressure gradient and the theoretical standard deviation of pressure gradient to determine whether the pressure testing is complete;

(b) if the pressure survey is not complete,
(i) using said pressure survey tool to measure an additional pressure of the geological formation at a measured depth;
(ii) revising said set of pressure and depth data using additional pressure and measured depth;
(iii) revising the actual pressure gradient and the actual standard deviation of pressure gradient based upon the revised set of pressure and depth data; and
(iv) revising the revised theoretical standard deviation of pressure gradient based upon the depth data in the revised set of pressure and depth data and the repeatability of the pressure survey tool;

(c) if the actual pressure gradient, the actual standard deviation of pressure gradient, and theoretical standard deviation has been re-determined in steps (b)(iii)–(iv), repeating steps (a)–(b).

33. The program product of claim 31 further including instructions for performing the steps of claim 16 when selecting the pressure survey tool.

34. The program product of claim 32 further including instructions for performing the steps of claim 16 when selecting the pressure survey tool.

35. The program product of claim 32 further including instructions for performing the steps of claim 17 when selecting the pressure survey tool.

36. An apparatus for performing a pressure survey for a geological formation comprising:

(a) circuitry operable for receiving information from a pressure survey tool;

(b) circuitry operable for generating a set of pressure and depth data by
(i) using said pressure survey tool to measure a first pressure of the geological formation at a first depth;
(ii) using said pressure survey tool to measure a subsequent pressure of the geological formation at a subsequent depth;

(c) circuitry operable for determining an actual pressure gradient and an actual standard deviation of pressure gradient based upon the set of pressure and depth data; and (d) circuitry operable for determining a theoretical standard deviation of pressure gradient based upon the depth data in the set of pressure and depth data and the repeatability of the pressure survey tool.

37. The apparatus of claim 36 further comprising:

(a) circuitry operable for comparing the actual standard deviation of pressure gradient and the theoretical standard deviation of pressure gradient to determine whether the pressure testing is complete;

(b) circuitry operable for,
(i) using said pressure survey tool to measure an additional pressure of the geological formation at a measured depth when the pressure survey is not complete;
(ii) revising said set of pressure and depth data using additional pressure and measured depth;
(iii) revising the actual pressure gradient and the actual standard deviation of pressure gradient based upon the revised set of pressure and depth data; and
(iv) revising the revised theoretical standard deviation of pressure gradient based upon the depth data in the revised set of pressure and depth data and the repeatability of the pressure survey tool;

(c) circuitry operable for repeating the operation of the circuitry operable for the steps (a)–(b) when the actual pressure gradient, the actual standard deviation of pressure gradient, and theoretical standard deviation has been re-determined in steps (b)(iii)–(iv).

38. The apparatus of claim 36 further comprising the pressure survey tool, wherein the pressure survey tool has a measured repeatability and wherein the pressure survey tool is operatively connected to said circuitry operable for receiving information from the pressure survey tool.

39. The apparatus of claim 37 further comprising the pressure survey tool, wherein the pressure survey tool has a measured repeatability and wherein the pressure survey tool is operatively connected to said circuitry operable for receiving information from the pressure survey tool.

* * * * *